United States Patent
Aybay

(10) Patent No.: US 9,356,885 B2
(45) Date of Patent: *May 31, 2016

(54) METHODS AND APPARATUS RELATED TO A DISTRIBUTED SWITCH FABRIC

(71) Applicant: Juniper Networks, Inc., Sunnyvale, CA (US)

(72) Inventor: Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/610,143

(22) Filed: Jan. 30, 2015

(65) Prior Publication Data

US 2015/0139222 A1  May 21, 2015

Related U.S. Application Data

(63) Continuation of application No. 12/607,162, filed on Oct. 28, 2009, now Pat. No. 8,953,603.

(51) Int. Cl.
*H04L 12/947* (2013.01)
*H04L 12/54* (2013.01)
(Continued)

(52) U.S. Cl.
CPC ............ *H04L 49/25* (2013.01); *H04L 12/5601* (2013.01); *H04L 45/74* (2013.01); *H04L 49/101* (2013.01); *H04L 49/1561* (2013.01); *H04L 49/1569* (2013.01); *H04L 49/1576* (2013.01);
(Continued)

(58) Field of Classification Search
CPC ...................................................... H04L 12/74
USPC ......................................................... 370/355
See application file for complete search history.

(56) References Cited

U.S. PATENT DOCUMENTS

| 4,215,402 A | 7/1980 | Mitchell et al. |
| 4,400,627 A | 8/1983 | Zola |

(Continued)

FOREIGN PATENT DOCUMENTS

| CN | 101388847 | 3/2009 |
| EP | 0 809 380 A2 | 11/1997 |
| GB | 2 361 139 A | 10/2001 |

OTHER PUBLICATIONS

Cisco: "Cisco VN-Link: Virtualization-Aware Networking," Cisco Public Information, Cisco Systems, [Online] Mar. 1, 2009 (pp. 1-10), XP002593596, Retrieved from the Internet: <URL: http:--www.cisco.com-en-US-solutions-collateral-ns340-ns517-ns224-ns892-ns894-white paper c11-525307.pdf> [retrieved on Jul. 26, 2010].

(Continued)

*Primary Examiner* — Edan Orgad
*Assistant Examiner* — Emmanuel Maglo
(74) *Attorney, Agent, or Firm* — Cooley LLP

(57) ABSTRACT

A method of sending data to a switch fabric includes assigning a destination port of an output module to a data packet based on at least one field in a first header of the data packet. A module associated with a first stage of the switch fabric is selected based on at least one field in the first header. A second header is appended to the data packet. The second header includes an identifier associated with the destination port of the output module. The data packet is sent to the module associated with the first stage. The module associated with the first stage is configured to send the data packet to a module associated with a second stage of the switch fabric based on the second header.

19 Claims, 6 Drawing Sheets

(51) Int. Cl.
*H04L 12/933* (2013.01)
*H04L 12/935* (2013.01)
*H04L 12/741* (2013.01)

(52) U.S. Cl.
CPC .......... *H04L 49/256* (2013.01); *H04L 49/3009* (2013.01)

(56) References Cited

U.S. PATENT DOCUMENTS

| | | | |
|---|---|---|---|
| 5,130,984 A | 7/1992 | Cisneros | |
| 5,138,615 A | 8/1992 | Lamport et al. | |
| 5,193,087 A | 3/1993 | Lichtash et al. | |
| 5,801,641 A | 9/1998 | Yang et al. | |
| 5,926,473 A | 7/1999 | Gridley | |
| 5,987,027 A | 11/1999 | Park et al. | |
| 5,987,028 A | 11/1999 | Yang et al. | |
| 5,991,295 A | 11/1999 | Tout et al. | |
| 6,011,779 A | 1/2000 | Wills | |
| 6,073,089 A | 6/2000 | Baker et al. | |
| 6,075,773 A | 6/2000 | Clark et al. | |
| 6,157,955 A | 12/2000 | Narad et al. | |
| 6,212,184 B1 | 4/2001 | Venkatachary et al. | |
| 6,226,629 B1 | 5/2001 | Cossock | |
| 6,266,705 B1 | 7/2001 | Ullum et al. | |
| 6,452,926 B1* | 9/2002 | Wiklund | H04L 12/5601 370/217 |
| 6,457,058 B1 | 9/2002 | Ullum et al. | |
| 6,522,627 B1 | 2/2003 | Mauger | |
| 6,618,397 B1 | 9/2003 | Huang | |
| 6,633,548 B2 | 10/2003 | Bachmutsky et al. | |
| 6,654,373 B1 | 11/2003 | Maher, III et al. | |
| 6,657,962 B1 | 12/2003 | Barri et al. | |
| 6,658,482 B1 | 12/2003 | Chen et al. | |
| 6,717,956 B1 | 4/2004 | Fan et al. | |
| 6,721,316 B1 | 4/2004 | Epps et al. | |
| 6,731,644 B1 | 5/2004 | Epps et al. | |
| 6,735,670 B1 | 5/2004 | Bronstein | |
| 6,754,662 B1 | 6/2004 | Li | |
| 6,775,230 B1 | 8/2004 | Watanabe et al. | |
| 6,778,546 B1 | 8/2004 | Epps et al. | |
| 6,778,984 B1 | 8/2004 | Lu et al. | |
| 6,807,172 B1 | 10/2004 | Levenson et al. | |
| 6,813,243 B1 | 11/2004 | Epps et al. | |
| 6,816,487 B1 | 11/2004 | Roberts et al. | |
| 6,889,225 B2 | 5/2005 | Cheng et al. | |
| 6,920,130 B2 | 7/2005 | Ramey | |
| 6,920,135 B1* | 7/2005 | Lea | H04L 49/1507 370/389 |
| 6,925,085 B1 | 8/2005 | Krishna et al. | |
| 6,940,862 B2 | 9/2005 | Goudreau | |
| 6,970,902 B1 | 11/2005 | Moon | |
| 6,973,032 B1 | 12/2005 | Casley et al. | |
| 6,977,930 B1 | 12/2005 | Epps et al. | |
| 6,985,486 B1 | 1/2006 | Agrawal | |
| 7,027,412 B2 | 4/2006 | Miyamoto et al. | |
| 7,046,687 B1* | 5/2006 | Brown | H04L 45/7453 370/412 |
| 7,069,413 B1 | 6/2006 | Agesen et al. | |
| 7,075,934 B2 | 7/2006 | Chiussi et al. | |
| 7,089,240 B2 | 8/2006 | Basso et al. | |
| 7,102,999 B1* | 9/2006 | Sindhu | H04L 49/45 370/235 |
| 7,113,505 B2 | 9/2006 | Williams | |
| 7,190,696 B1 | 3/2007 | Manur et al. | |
| 7,193,997 B2 | 3/2007 | Van Lunteren et al. | |
| 7,221,676 B2 | 5/2007 | Green et al. | |
| 7,230,947 B1 | 6/2007 | Huber et al. | |
| 7,245,582 B1 | 7/2007 | Roberts et al. | |
| 7,313,135 B2 | 12/2007 | Wyatt | |
| 7,327,680 B1 | 2/2008 | Kloth | |
| 7,356,033 B2 | 4/2008 | Basu et al. | |
| 7,369,561 B2 | 5/2008 | Wybenga et al. | |
| 7,373,345 B2 | 5/2008 | Carpentier et al. | |
| 7,382,876 B2 | 6/2008 | Lauter et al. | |
| 7,391,736 B2 | 6/2008 | Na et al. | |
| 7,394,809 B2 | 7/2008 | Kumar et al. | |
| 7,406,038 B1 | 7/2008 | Oelke et al. | |
| 7,409,487 B1 | 8/2008 | Chen et al. | |
| 7,415,034 B2 | 8/2008 | Muller et al. | |
| 7,418,505 B2 | 8/2008 | Lim et al. | |
| 7,428,219 B2 | 9/2008 | Khosravi | |
| 7,430,164 B2 | 9/2008 | Bare | |
| 7,441,268 B2 | 10/2008 | Remedios | |
| 7,580,415 B2 | 8/2009 | Hudson et al. | |
| 7,602,787 B2 | 10/2009 | Cheriton | |
| 7,630,368 B2 | 12/2009 | Tripathi et al. | |
| 7,689,747 B2 | 3/2010 | Vega et al. | |
| 7,738,457 B2 | 6/2010 | Nordmark et al. | |
| 7,757,059 B1 | 7/2010 | Ofer et al. | |
| 7,788,411 B2 | 8/2010 | Belgaied et al. | |
| 7,836,212 B2 | 11/2010 | Tripathi et al. | |
| 8,045,546 B1 | 10/2011 | Bao et al. | |
| 8,050,256 B1 | 11/2011 | Bao et al. | |
| 2002/0064170 A1 | 5/2002 | Siu et al. | |
| 2002/0118644 A1 | 8/2002 | Moir | |
| 2002/0118692 A1 | 8/2002 | Oberman et al. | |
| 2002/0138648 A1 | 9/2002 | Liu | |
| 2002/0152209 A1 | 10/2002 | Merugu et al. | |
| 2002/0159449 A1* | 10/2002 | Carson | G06T 7/20 370/389 |
| 2002/0191605 A1 | 12/2002 | Lunteren et al. | |
| 2002/0194294 A1 | 12/2002 | Blumenau et al. | |
| 2003/0026287 A1 | 2/2003 | Mullendore et al. | |
| 2003/0059045 A1 | 3/2003 | Ruehle | |
| 2003/0065878 A1 | 4/2003 | Krishna et al. | |
| 2003/0142668 A1 | 7/2003 | Wyatt | |
| 2004/0151188 A1 | 8/2004 | Maveli et al. | |
| 2004/0177157 A1 | 9/2004 | Mistry et al. | |
| 2004/0205253 A1 | 10/2004 | Arndt et al. | |
| 2004/0254909 A1 | 12/2004 | Testa | |
| 2005/0058128 A1* | 3/2005 | Carson | G06T 7/20 370/388 |
| 2005/0083935 A1 | 4/2005 | Kounavis et al. | |
| 2005/0111460 A1 | 5/2005 | Sahita | |
| 2005/0138308 A1 | 6/2005 | Morishita et al. | |
| 2005/0177552 A1 | 8/2005 | Bass et al. | |
| 2005/0192969 A1 | 9/2005 | Haga et al. | |
| 2005/0198303 A1 | 9/2005 | Knauerhase et al. | |
| 2005/0226235 A1 | 10/2005 | Kumar et al. | |
| 2006/0050690 A1 | 3/2006 | Epps et al. | |
| 2006/0083247 A1 | 4/2006 | Mehta | |
| 2006/0221956 A1 | 10/2006 | Narayan et al. | |
| 2006/0221967 A1 | 10/2006 | Narayan et al. | |
| 2006/0259952 A1 | 11/2006 | Lok | |
| 2007/0005685 A1 | 1/2007 | Chau et al. | |
| 2007/0008949 A1 | 1/2007 | Balandin | |
| 2007/0008962 A1 | 1/2007 | Basu et al. | |
| 2007/0014288 A1 | 1/2007 | Lim et al. | |
| 2007/0071233 A1 | 3/2007 | Zak | |
| 2007/0078988 A1 | 4/2007 | Miloushev et al. | |
| 2007/0079307 A1 | 4/2007 | Dhawan et al. | |
| 2007/0098408 A1 | 5/2007 | Handelman | |
| 2007/0140235 A1 | 6/2007 | Aysan et al. | |
| 2007/0204265 A1 | 8/2007 | Oshins | |
| 2007/0211716 A1 | 9/2007 | Oz et al. | |
| 2007/0219911 A1 | 9/2007 | Abe | |
| 2007/0234005 A1 | 10/2007 | Erlingsson et al. | |
| 2007/0244997 A1 | 10/2007 | Tindal | |
| 2007/0280243 A1 | 12/2007 | Wray et al. | |
| 2007/0280253 A1 | 12/2007 | Rooholamini et al. | |
| 2007/0283186 A1 | 12/2007 | Madnani et al. | |
| 2007/0297428 A1 | 12/2007 | Bose et al. | |
| 2008/0002663 A1 | 1/2008 | Tripathi et al. | |
| 2008/0005344 A1 | 1/2008 | Ford et al. | |
| 2008/0019365 A1 | 1/2008 | Tripathi et al. | |
| 2008/0043756 A1 | 2/2008 | Droux et al. | |
| 2008/0043765 A1 | 2/2008 | Belgaied et al. | |
| 2008/0046610 A1 | 2/2008 | Tripathi et al. | |
| 2008/0046735 A1 | 2/2008 | Nedeltchev et al. | |
| 2008/0080548 A1 | 4/2008 | Mullendore et al. | |
| 2008/0082977 A1 | 4/2008 | Araujo et al. | |
| 2008/0095361 A1 | 4/2008 | Wifvesson et al. | |
| 2008/0098392 A1 | 4/2008 | Wipfel et al. | |

(56) References Cited

U.S. PATENT DOCUMENTS

| | | | |
|---|---|---|---|
| 2008/0117909 A1 | 5/2008 | Johnson | |
| 2008/0130517 A1 | 6/2008 | Lee et al. | |
| 2008/0148341 A1 | 6/2008 | Ferguson | |
| 2008/0155223 A1 | 6/2008 | Hiltgen et al. | |
| 2008/0177812 A1 | 7/2008 | Brandle | |
| 2008/0186875 A1 | 8/2008 | Kitani | |
| 2008/0192648 A1 | 8/2008 | Galles | |
| 2008/0205377 A1 | 8/2008 | Chao et al. | |
| 2008/0212592 A1 | 9/2008 | Wybenga et al. | |
| 2008/0219184 A1 | 9/2008 | Fowler et al. | |
| 2008/0225853 A1 | 9/2008 | Melman et al. | |
| 2008/0228781 A1 | 9/2008 | Chen et al. | |
| 2008/0240104 A1 | 10/2008 | Villait et al. | |
| 2008/0240122 A1 | 10/2008 | Richardson et al. | |
| 2008/0244579 A1 | 10/2008 | Muller | |
| 2008/0259934 A1 | 10/2008 | Matthews et al. | |
| 2008/0270564 A1 | 10/2008 | Rangegowda et al. | |
| 2009/0013062 A1 | 1/2009 | Blatherwick et al. | |
| 2009/0025007 A1 | 1/2009 | Hara et al. | |
| 2009/0037680 A1 | 2/2009 | Colbert et al. | |
| 2009/0052461 A1 | 2/2009 | Brown et al. | |
| 2009/0083445 A1 | 3/2009 | Ganga | |
| 2009/0106409 A1 | 4/2009 | Murata | |
| 2009/0106766 A1 | 4/2009 | Masuda | |
| 2009/0109479 A1 | 4/2009 | Kato | |
| 2009/0135816 A1 | 5/2009 | Nandagopal et al. | |
| 2009/0150529 A1 | 6/2009 | Tripathi | |
| 2009/0157701 A1 | 6/2009 | Lahiri et al. | |
| 2009/0190598 A1 | 7/2009 | Christensen et al. | |
| 2009/0196297 A1 | 8/2009 | Jabr | |
| 2009/0198761 A1 | 8/2009 | Nanda et al. | |
| 2009/0240790 A1 | 9/2009 | Utsunomiya et al. | |
| 2009/0274044 A1 | 11/2009 | Goose et al. | |
| 2009/0276772 A1 | 11/2009 | Garrett et al. | |
| 2009/0276774 A1 | 11/2009 | Kinoshita | |
| 2009/0292858 A1 | 11/2009 | Lambeth et al. | |
| 2009/0307597 A1 | 12/2009 | Bakman | |
| 2009/0313620 A1 | 12/2009 | Sedukhin et al. | |
| 2010/0027420 A1 | 2/2010 | Smith | |
| 2010/0042708 A1 | 2/2010 | Stamler et al. | |
| 2010/0042719 A1 | 2/2010 | Kinoshita | |
| 2010/0043068 A1 | 2/2010 | Varadhan et al. | |
| 2010/0050172 A1 | 2/2010 | Ferris | |
| 2010/0054129 A1 | 3/2010 | Kuik et al. | |
| 2010/0077158 A1 | 3/2010 | Asano | |
| 2010/0091961 A1 | 4/2010 | Jones et al. | |
| 2010/0128605 A1 | 5/2010 | Chavan et al. | |
| 2010/0131636 A1 | 5/2010 | Suri et al. | |
| 2010/0165876 A1 | 7/2010 | Shukla et al. | |
| 2010/0165877 A1 | 7/2010 | Shukla et al. | |
| 2010/0169467 A1 | 7/2010 | Shukla et al. | |
| 2011/0019550 A1 | 1/2011 | Bryers et al. | |
| 2011/0103259 A1 | 5/2011 | Aybay et al. | |
| 2012/0170575 A1* | 7/2012 | Mehra | H04L 41/00 370/359 |

OTHER PUBLICATIONS

U.S. Appl. No. 12/346,608, filed Dec. 30, 2008, entitled "Methods and Apparatus Related to Data Transmissions Between Virtual Resources Via A Network Device" (80 pgs).
Office Action mailed Dec. 23, 2010 for U.S. Appl. No. 12/346,623 (19 pages).
Office Action mailed Jun. 16, 2011 for U.S. Appl. No. 12/346,623 (13 pages).
Office Action mailed Sep. 17, 2010 for U.S. Appl. No. 12/346,608 (28 pages).
Office Action mailed Apr. 14, 2011 for U.S. Appl. No. 12/346,608 (24 pages).
Final Office Action mailed Jul. 26, 2011 for U.S. Appl. No. 12/346,608 (30 pages).
Office Action mailed Jan. 17, 2012 for U.S. Appl. No. 12/346,608 (29 pages).
U.S. Appl. No. 12/346,612, filed Dec. 30, 2008, entitled "Methods and Apparatus Related to Data Transmissions Between Virtual Resources At A Host Device" (78 pgs).
Office Action mailed Apr. 1, 2011 for U.S. Appl. No. 12/346,612 (19 pages).
Final Office Action mailed Dec. 5, 2011 for U.S. Appl. No. 12/346,612 (24 pages).
U.S. Appl. No. 12/346,615, filed Dec. 30, 2008, entitled "Methods and Apparatus for Routing Between Virtual Resources Based on a Routing Location Policy" (79 pgs).
Office Action mailed Sep. 15, 2010 for U.S. Appl. No. 12/346,615 (21 pages).
Office Action mailed Mar. 21, 2011 for U.S. Appl. No. 12/346,615 (9 pages).
U.S. Appl. No. 12/346,618, filed Dec. 30, 2008, entitled "Methods and Apparatus for Provisioning at a Network Device in Response to a Virtual Resource Migration Notification" (80 pgs).
Office Action mailed Sep. 15, 2010 for U.S. Appl. No. 12/346,618 (13 pages).
Office Action mailed Apr. 7, 2011 for U.S. Appl. No. 12/346,618 (14 pages).
U.S. Appl. No. 12/346,625, filed Dec. 30, 2008, entitled "Methods and Apparatus Related to Managing Communications Between Virtual Resources" (43 pgs).
Office Action mailed Sep. 17, 2010 for U.S. Appl. No. 12/346,625 (24 pages).
Office Action mailed Mar. 29, 2011 for U.S. Appl. No. 12/346,625 (13 pages).
Final Office Action mailed Dec. 14, 2011 for U.S. Appl. No. 12/346,625 (14 pages).
Office Action mailed Jul. 3, 2012 for U.S. Appl. No. 12/346,625 (14 pages).
Office Action mailed Oct. 5, 2010 for U.S. Appl. No. 12/346,632 (16 pages).
Office Action mailed Mar. 14, 2011 for U.S. Appl. No. 12/346,632 (21 pages).
Final Office Action mailed Aug. 15, 2011 for U.S. Appl. No. 12/346,632 (23 pages).
Office Action mailed Dec. 21, 2011 for U.S. Appl. No. 12/346,632 (27 pages).
U.S. Appl. No. 12/612,210, filed Nov. 4, 2009, entitled "Methods and Apparatus for Configuring a Virtual Network Switch" (50 pgs).
Partial European Search Report mailed Mar. 4, 2011 for European Application No. 10187574.8 (6 pages).
Extended European Search Report mailed Aug. 17, 2011 for European Application No. 10187574.8 (10 pages).
U.S. Appl. No. 12/976,508, filed Dec. 22, 2010, entitled "Methods and Apparatus for Tunnel Management Within a Data Center" (42 pgs).
U.S. Appl. No. 12/981,678, filed Dec. 30, 2010, entitled "Apparatus, Systems and Methods for Aggregate Routes Within a Communications Network" (38 pgs).
Office Action mailed Oct. 28, 2010 for U.S. Appl. No. 12/346,630 (24 pages).
Office Action mailed Apr. 27, 2011 for U.S. Appl. No. 12/346,630 (15 pages).
Final Office Action mailed Oct. 26, 2011 for U.S. Appl. No. 12/346,630 (17 pages).
Partial European Search Report dated Feb. 4, 2011 for European Application No. 10188736.2 (6 pages).
Gunes Aybay et al., "Front-to-Back Cooling System for Modular Systems with Orthogonal Midplane Configuration" U.S. Appl. No. 12/167,604, filed Jul. 3, 2008, (25 pgs).
Extended European Search report for European Application No. 10188736.2, mailed May 10, 2011.
Office Action for European Application No. 10188736.2, mailed May 16, 2013.
Office Action for European Application No. 10188736.2, mailed Nov. 18, 2013.
Office Action for Chinese Application No. 201010278909.5, mailed Feb. 28, 2013.
EESR for corresponding European Application No. 15170843.5, mailed on Oct. 6, 2015.

* cited by examiner

METHODS AND APPARATUS RELATED TO A DISTRIBUTED SWITCH FABRIC

This application is a continuation application of U.S. patent application Ser. No. 12/607,162, filed Oct. 28, 2009 and entitled "Methods and Apparatus Related to a Distributed Switch Fabric, the disclosure of which is hereby incorporated by reference in its entirety.

BACKGROUND

Embodiments described herein relate generally to switch fabrics and more particularly, to sending data through switch fabrics (e.g., Clos networks).

Known switch fabrics can be multi-stage networks that provide connections between multiple input ports and multiple output ports. Thus, through a switch fabric, a first peripheral device operatively coupled to the switch fabric can send data to a second peripheral device operatively coupled to the switch fabric.

A three-stage Clos network, for example, has a middle stage connected between an input stage and an output stage. Each stage includes multiple modules. Each input stage module has multiple input ports and is operatively coupled to each middle stage module. Similarly, each output stage module has multiple output ports and is connected to each middle stage module.

As the data traverses the switch fabric, each stage determines to which subsequent stage to send the data. To make these decisions, a header (e.g., a packet header) can be used. Each stage of known Ethernet switch fabrics, for example, perform layer 2/layer 3 (L2/L3) packet forwarding, lookup and classification. In some known switch fabrics including more than a single stage, such forwarding, lookup and classification functions can significantly increase the end-to-end latency of the switch fabric. Further, adding additional peripheral devices and/or stages to the switch fabric can significantly increase the end-to-end latency of the switch fabric.

Additionally, known Ethernet switch fabrics often do not ensure that data packets sent from a first peripheral device to a second peripheral device traverse the switch fabric using the same path. Accordingly, packet order is not preserved at the output of the switch fabric and the second peripheral device reorders the data packets, causing further latency and increasing buffering requirements.

Thus, a need exists for a switch fabric that has a relatively low end-to-end latency when compared with known switch fabrics. Additionally, a need exists for a switch fabric that preserves packet ordering.

SUMMARY

A method of sending data to a switch fabric includes assigning a destination port of an output module to a data packet based on at least one field in a first header of the data packet. A module associated with a first stage of the switch fabric is selected based on at least one field in the first header. A second header is appended to the data packet. The second header includes an identifier associated with the destination port of the output module. The data packet is sent to the module associated with the first stage. The module associated with the first stage is configured to send the data packet to a module associated with a second stage of the switch fabric based on the second header.

DETAILED DESCRIPTION

Figure 1:
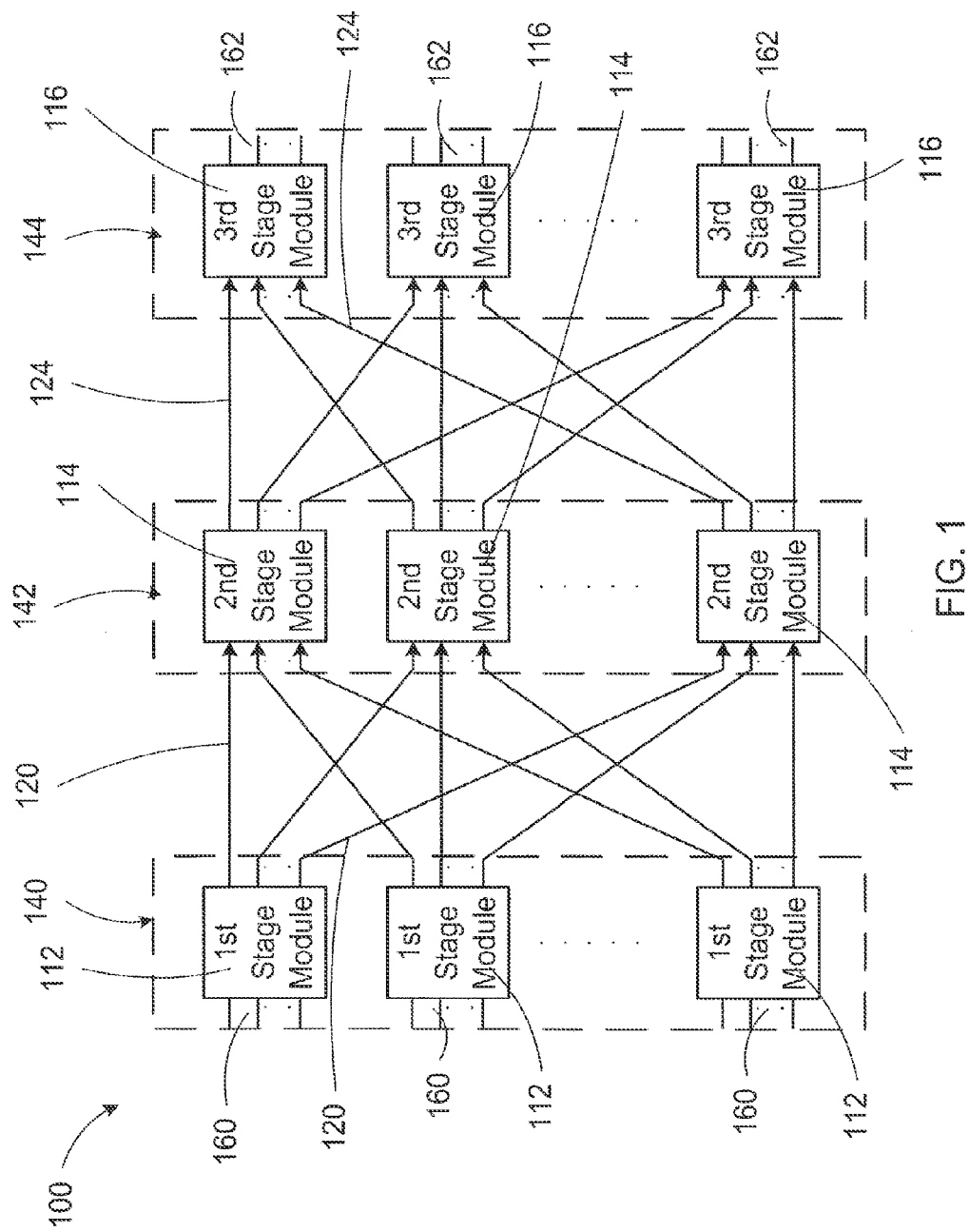
FIG. 1 is a schematic illustration of a switch fabric system, according to an embodiment.

In some embodiments, a method of sending data to a switch fabric includes assigning a destination port of an output module (e.g., an edge device) to a data packet (or a data cell) based on at least one field in a first header of the data packet (or data cell). A module associated with a first stage of the switch fabric is selected based on at least one field in the first header. A second header is appended to the data packet (or data cell). The second header includes an identifier associated with the destination port of the output module. The data packet (or data cell) is sent to the module associated with the first stage. The module associated with the first stage is configured to send the data packet (or data cell) to a module associated with a second stage of the switch fabric based on the second header.

In some embodiments, the first header includes a destination Media Access Control (MAC) address, a destination internet protocol (IP) address, a source MAC address, a source IP address and/or a transfer protocol. A portion of the data in the first header can be used as an input to a hash function. The output of the hash function can identify which module associated with the first stage is selected.

In some embodiments, the second header includes a destination identifier, such as, for example, an identifier of a destination edge device, an identifier of a destination port on a destination edge device, and/or the like. Before entering the switch fabric, the destination identifier can be determined using the data in the first header and a lookup table, which can associate the destination MAC address and/or the destination IP address of a destination peripheral device with a destination port to which the destination peripheral device is coupled.

After the second header is appended to the data packet and the data packet is sent into the switch fabric, the modules associated with the switch fabric can use the destination identifier as an input to a hash function to determine to which module associated with the next stage of the switch fabric to send the data packet. Accordingly, the modules within the switch fabric need not use a lookup table to associate the destination MAC address and/or the destination IP address of the destination peripheral device with the destination port to which the destination peripheral device is coupled because the second header contains the result of such an association. Accordingly, the modules within the switch fabric take less time to route the data packet using the second header, than switch fabrics where the first header alone is used for routing within the switch fabric.

Additionally, in some embodiments, using the destination identifier to route the data packet through the switch fabric ensures that data packets sent from a same source peripheral device to the same destination peripheral device at different times will traverse the switch fabric using the same path as long the switch fabric system is operating in the same configuration at the different times (e.g., the hash functions used are the same, the peripheral devices are coupled to the switch fabric in the same manner, etc.). In such embodiments, this ensures that the order that the data packets are received by the destination peripheral device is the same as the order in which the data packets were sent by the source peripheral device.

In some embodiments, a switch fabric system includes multiple edge devices, multiple modules associated with a first stage of the switch fabric system, and multiple modules associated with a second stage of the switch fabric system. A first edge device from the set of edge devices is configured to receive a set of data packets. Each data packet from the set of data packets can include a first header. The first edge device is configured to append a second header to each data packet based on at least one field in the first header. The second header includes an identifier associated with a destination port of a second edge device from the set of edge devices. The first edge device is configured to send each data packet from the set of data packets to a module from the plurality of modules associated with the first stage based on the first header. The set of modules associated with the first stage of the switch fabric system is configured to send each data packet from the set of data packets to a module from the set of modules associated with the second stage based on the second header.

In some embodiments, a processor-readable medium stores code representing instructions configured to cause a processor to assign a destination port of an output module (e.g., an edge device) to a data packet based on an identifier of a destination node operatively coupled to the destination port of the output module through at least a switch fabric. The identifier of the destination node is within a first header of the data packet. A second header is appended to the data packet. The second header includes an identifier associated with the destination port of the output module. A module associated with a first stage of the switch fabric is selected using a result of a first hash function having as inputs a set of fields in the first header. The data packet is sent to the module associated with the first stage. The module associated with the first stage is configured to select a module associated with a second stage of the switch fabric using a result of a second hash function having as an input the identifier associated with the destination port of the output module from the second header.

As used herein, a switch fabric system can be a system that includes a switch fabric and devices coupled to the switch fabric. In some embodiments, for example, a switch fabric system can include multiple input/output modules (e.g., an edge device, an access switch, etc.) operatively coupled to the switch fabric such that the input/output modules can send data to and receive data from the switch fabric. Additionally, in some embodiments, the switch fabric system can include peripheral devices (e.g., servers, storage devices, gateways, workstations, etc.) operatively coupled to the input/output modules such that the peripheral devices can send data to and receive data from the switch fabric via the input/output modules. In such embodiments, for example, a first peripheral device can send data to a second peripheral device via the input/output modules and the switch fabric, as described in further detail herein.

As used herein, a switch fabric can be a network that includes multiple stages of switches that operatively connect one or more input devices (e.g., a first edge device) with one or more output devices (e.g., a second edge device). A switch fabric can be configured to receive a signal from an input device, forward the signal through the multiple stages of switches, and output the signal to an output device. Each switch of the multiple stages of switches routes the signal such that the signal arrives at its destination. Such a switch fabric can be referred to, for example, as a Clos network.

As used herein, a module that is within a switch fabric can be any assembly and/or set of operatively coupled electrical components that defines one or more switches within a stage of a switch fabric. An input/output module (e.g., an edge device, an access switch, etc.), for example, can be any assembly and/or set of operatively coupled electrical components configured to send data to and/or receive data from a switch fabric. In some embodiments, for example, an input/output module can be an access switch or an edge device configured receive data from a server, prepare data to enter into the switch fabric, and send the data to the switch fabric. In some embodiments, a module can include, for example, a memory, a processor, electrical traces, optical connectors, and/or the like.

As used in this specification, the singular forms "a," "an" and "the" include plural referents unless the context clearly dictates otherwise. Thus, for example, the term "a module" is intended to mean a single module or a combination of modules.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the "third stage" (the third and final stage with respect to the ingress to egress direction). For example, FIGS. 1-7 refer to specific stages within a given switch fabric. In other instances, however, the terms "first stage", "second stage" and so on refer to any stage within the stage fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic illustration of a switch fabric 100, according to an embodiment. Switch fabric 100 is a three-stage, non-blocking Clos network and includes a first stage 140, a second stage 142, and a third stage 144. The first stage 140 includes modules 112. Each module 112 of the first stage 140 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 112 of the first stage 140 is a switch (e.g., a packet switch, a frame switch and/or a cell switch). The switches are configured to redirect data (e.g., data packets, data cells, etc.) as it flows through the switch fabric 100. In some embodiments, for example, each switch includes multiple input ports operatively coupled to write interfaces on a memory buffer (not shown in FIG. 1). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

In alternate embodiments, each module of the first stage is a crossbar switch having input bars and output bars. Multiple switches within the crossbar switch connect each input bar with each output bar. When a switch within the crossbar switch is in an "on" position, the input is operatively coupled to the output and data can flow. Alternatively, when a switch within the crossbar switch is in an "off" position, the input is not operatively coupled to the output and data cannot flow. Thus, the switches within the crossbar switch control which input bars are operatively coupled to which output bars.

Each module 112 of the first stage 140 includes a set of input ports 160 configured to receive data (e.g., a signal, a cell of a packet, a data packet, etc.) as it enters the switch fabric 100. In this embodiment, each module 112 of the first stage 140 includes the same number of input ports 160.

Similar to the first stage 140, the second stage 142 of the switch fabric 100 includes modules 114. The modules 114 of the second stage 142 are structurally similar to the modules 112 of the first stage 140. Each module 114 of the second stage 142 is operatively coupled to each module 112 of the first stage 140 by a data path 120. Each data path 120 between a given module 112 of the first stage 140 and a given module 114 of the second stage 142 is configured to facilitate data transfer from the modules 112 of the first stage 140 to the modules 114 of the second stage 142.

The data paths 120 between the modules 112 of the first stage 140 and the modules 114 of the second stage 142 can be constructed in any manner configured to facilitate data transfer from the modules 112 of the first stage 140 to the modules 114 of the second stage 142. In some embodiments, for example, the data paths 120 are optical connectors between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 100 is a non-blocking Clos network. Thus, the number of modules 114 of the second stage 142 of the switch fabric 100 varies based on the number of input ports 160 of each module 112 of the first stage 140. In a rearrangeably non-blocking Clos network (e.g., a Benes network), the number of modules 114 of the second stage 142 is greater than or equal to the number of input ports 160 of each module 112 of the first stage 140. Thus, if n is the number of input ports 160 of each module 112 of the first stage 140 and m is the number of modules 114 of the second stage 142, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 144 of the switch fabric 100 includes modules 116. The modules 116 of the third stage 144 are structurally similar to the modules 112 of the first stage 140. The number of modules 116 of the third stage 144 is typically equivalent to the number of modules 112 of the first stage 140. Each module 116 of the third stage 144 includes output ports 162 configured to allow data to exit the switch fabric 100. Each module 116 of the third stage 144 includes the same number of output ports 162. Further, the number of output ports 162 of each module 116 of the third stage 144 is typically equivalent to the number of input ports 160 of each module 112 of the first stage 140.

Each module 116 of the third stage 144 is connected to each module 114 of the second stage 142 by a data path 124. The data paths 124 between the modules 114 of the second stage 142 and the modules 116 of the third stage 144 are configured to facilitate data transfer from the modules 114 of the second stage 142 to the modules 116 of the third stage 144.

The data paths 124 between the modules 114 of the second stage 142 and the modules 116 of the third stage 144 can be constructed in any manner configured to facilitate data transfer from the modules 114 of the second stage 142 to the modules 116 of the third stage 144. In some embodiments, for example, the data paths 124 are optical connectors between the modules. In other embodiments, the data paths are within a midplane. Such a midplane can be similar to that described in further detail herein. Such a midplane can be used to connect each module of the second stage with each module of the third stage. In still other embodiments, two or more modules are contained within a single chip package and the data paths are electrical traces.

Figure 2:
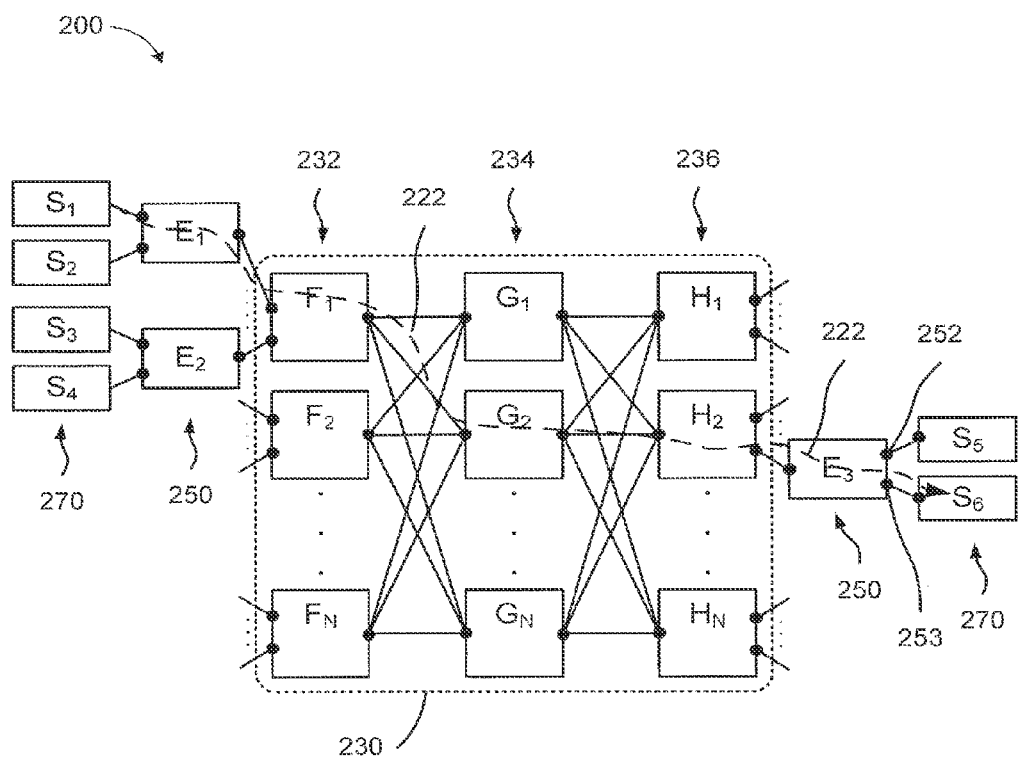
FIG. 2 is schematic illustration of a switch fabric system, according to another embodiment.

FIG. 2 is schematic illustration of a switch fabric system 200, according to another embodiment. The switch fabric system 200 includes a switch fabric 230, multiple edge devices 250 operatively coupled to the switch fabric 230, and multiple peripheral devices 270 operatively coupled to the edge devices 250. As described in further detail herein and as shown by path 222 in FIG. 2, a first peripheral device 270 (e.g., $S_1$) is configured to send a data packet to a second peripheral device 270 (e.g., $S_6$) via a first edge device 250 (e.g., $E_1$), the switch fabric 230, and a second edge device 250 (e.g., $E_3$).

The switch fabric 230 can be structurally and functionally similar to the switch fabric 100. Accordingly, the switch fabric includes modules $F_1$-$F_N$ associated with a first stage 232 of the switch fabric 230, modules $G_1$-$G_N$ associated with a second stage 234 of the switch fabric 230, and modules $H_1$-$H_N$ associated with a third stage 236 of the switch fabric. Each module $F_1$-$F_N$ associated with the first stage 232 is operatively coupled to each module $G_1$-$G_N$ associated with the second stage 234 via data paths. Similarly, each module $G_1$-$G_N$ associated with the second stage 234 is operatively coupled to each module $H_1$-$H_N$ associated with the third stage 236. The data paths between the modules $F_1$-$F_N$ associated with the first stage 232 and the modules $G_1$-$G_N$ associated with the second stage 234 and/or the data paths between the modules $G_1$-$G_N$ associated with the second stage 234 and the modules $H_1$-$H_N$ associated with the third stage 236 can be constructed in any manner configured to facilitate data transfer. In some embodiments, for example, the data paths include optical connectors and optical fibers between the modules. In other embodiments, the data paths are within a midplane.

The modules $F_1$-$F_N$ associated with a first stage 232 are configured to send data (e.g., data packets, data cells, etc.) to modules $G_1$-$G_N$ associated with a second stage 234. As described in further detail herein, in some embodiments, a module $F_1$-$F_N$ associated with the first stage 232 is configured to determine to which module $G_1$-$G_N$ associated with the second stage 234 to send the data packet based on a header of the data packet (e.g., destination identifier 432 shown and described with respect to FIG. 5). The module $F_1$-$F_N$ associated with the first stage 232 can, for example, select the module $G_1$-$G_N$ associated with the second stage 234 based on a result of a hash function using as an input the contents of the header (e.g., destination identifier 432 shown and described with respect to FIG. 5), as described in further detail herein. In some embodiments, for example, the hash function can use shift registers similar to the hash functions shown and described in U.S. patent application Ser. No. 12/242,158, filed on Sep. 30, 2008, and entitled "Methods and Apparatus for Producing a Hash Value based on a Hash Function," which is incorporated herein by reference in its entirety.

Figure 3:
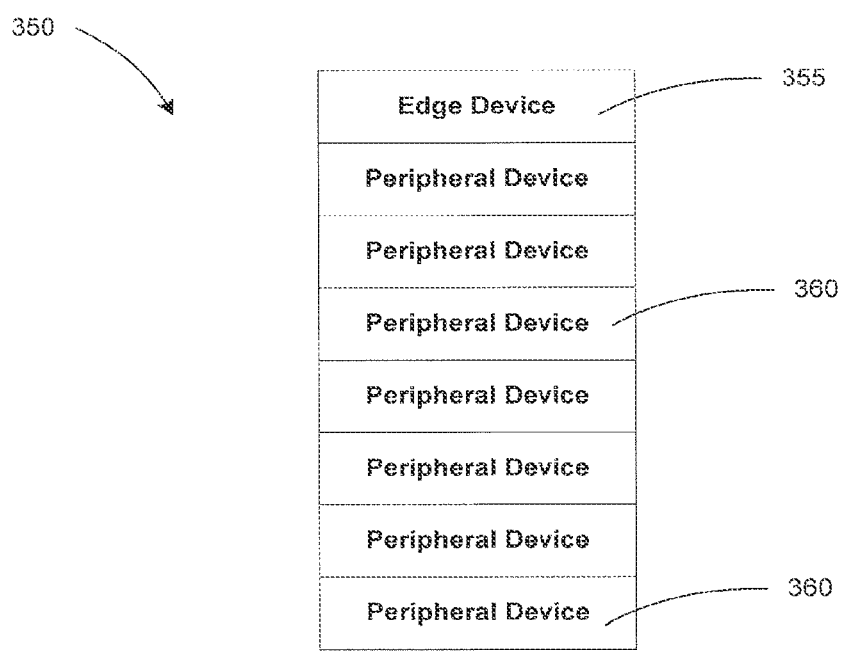
FIG. 3 is a schematic illustration of a chassis within a switch fabric system, according to another embodiment.

The peripheral devices 270 can be, for example, servers, storage devices, gateways, workstations, and/or the like. The peripheral devices 270 can be operatively coupled to the edge devices 250 using any suitable connection. For example, FIG. 3 illustrates a chassis 350 including an edge device 355 and multiple peripheral devices 360 operatively coupled to the edge device 355 via a backplane (not shown in FIG. 3). As such, the peripheral devices 360 are configured to send data (e.g., data packets, data cells, etc.) to the edge device 355 via the backplane. While shown in FIG. 3 as being disposed within a same chassis 350 as an edge device 355, in other embodiments, the peripheral devices are disposed remote from the edge device and are operatively coupled to the edge device via an optical connection (e.g., an optical cable and optical connectors), an electrical connection (e.g., an electrical cable and electrical connectors) and/or the like. Further, while the edge device 355 is shown as being operatively coupled to eight peripheral devices 360, in other embodiments, the edge device can be coupled to any number of peripheral devices. In some embodiments, for example, each edge device is operatively coupled to 48 peripheral devices.

The edge devices 250 can be any devices configured to operatively couple peripheral devices 270 to the switch fabric 230. In some embodiments, for example, the edge devices 250 can be access switches, input/output modules, top-of-rack devices and/or the like. Edge devices $E_1$ and $E_2$ are schematically shown as source edge devices and edge device $E_3$ is schematically shown as a destination edge device for illustration purposes only. Structurally, the edge devices 250 (including $E_1$, $E_2$, and $E_3$) can function as source edge devices and destination edge devices. Accordingly, the edge devices 250 can send data to and receive data from the switch fabric 230.

The edge devices 250 can store Media Access Control (MAC) addresses for other edge devices 250 and/or peripheral devices 270 within the switch fabric system 200. For example, an edge device $E_3$ can store the MAC addresses of the peripheral devices $S_5$, $S_6$ coupled to the edge device $E_3$. Using the MAC addresses of the peripheral devices $S_5$, $S_6$, the edge device $E_3$ can properly forward data packets to its destination when a data packet is received. In some embodiments, for example, an edge device 250 can be coupled to 48 peripheral devices 270 each running multiple virtual machines. If, for example, each peripheral device 270 is running 50 virtual machines, the edge device 250 will store 2400 MAC addresses of edge devices 250 to which it is coupled (e.g., source MAC address (SMACs)). In other embodiments, any number of peripheral devices running any number of virtual machines can be coupled to the edge device.

In some embodiments, the edge devices 250 also store multiple destination MAC addresses (DMACs). Such DMACs can be associated with peripheral devices 270 to which the peripheral devices 270 coupled to an edge device 250 can send data. For example, an edge device $E_1$ can store the MAC addresses of the peripheral devices $S_5$, $S_6$ and associate the MAC addresses with a destination port of $E_3$. Accordingly, the MAC address of peripheral device $S_5$ is associated with destination port 252 and the MAC address of $S_6$ is associated with destination port 253. In some embodiments, an edge device 250 can be coupled to 48 peripheral devices 250 each running 2400 virtual machines. If, for example, each of the 2400 virtual machines is sending data to or receiving data from a connection with 25 other virtual machines coupled to another edge device 250, the edge device 250 can store 60000 DMACs. In such an embodiment, each edge device 250 can store a total of 62400 MAC addresses (e.g., 60000 DMACs+2400 SMACs). In other embodiments, each edge device 250 can store any number of DMACs and/or SMACs.

In some embodiments, each edge device 250 includes a lookup table that associates the MAC addresses (e.g., the DMACs and the SMACs) with the port of an edge device 250 to which the peripheral device having the MAC address is coupled. For example, such a lookup table can associate $S_5$ with port 252 and $S_6$ with 253. In such embodiments, the edge device 250 can use the lookup table to determine how to forward the data packet, as described in further detail herein.

The edge devices 250 can be configured to prepare a data packet to enter the switch fabric 230. For example, the edge device 250 can be configured to forward, classify, and/or modify the packet encapsulation of a data packet prior to sending the data packet to the switch fabric 230. As described in further detail herein, in some embodiments, for example, a hash function using data stored within a header of a data packet (e.g., header portion 423 of FIG. 4) as an input is used to determine to which module $F_1$-$F_N$ associated with a first stage 232 the edge device 250 should send the data packet. In some embodiments, for example, the hash function can use shift registers similar to the hash functions shown and described in U.S. patent application Ser. No. 12/242,158, referenced above.

Additionally, as described in further detail herein, data within the header of a data packet (e.g., header portion 423 of FIG. 4) can be used to identify a destination port of a destination edge device 250 (e.g., destination port 252 or 253). An identifier of the destination port of the destination edge device 250 can be appended to the data packet (e.g., destination identifier 422 of FIG. 5). The identifier of the destination port can be used by the modules $F_1$-$F_N$, $G_1$-$G_N$, $H_1$-$H_N$ within the switch fabric 230 to correctly send the data packet through the switch fabric 230, as described in further detail herein.

In use, for example, a peripheral device $S_1$ can be configured to send a data packet to another peripheral device $S_6$, via path 222 (e.g., via an edge device $E_1$, the switch fabric 230 and an edge device $E_3$). FIG. 2 represents the peripheral device $S_1$ sending a data packet to peripheral device $S_6$ by way of example. Any peripheral device 270 operatively coupled to the switch fabric 230 via an edge device 250 can be configured to send a data packet to any other peripheral device 270 coupled to the switch fabric 230 via an edge device 250.

The peripheral device $S_1$ can send the data packet to the edge device $E_1$. The data packet can be similar to the data packet 420 shown and described in FIG. 4. The data packet 420 includes a packet data portion 425 and a packet header portion 423. The packet data portion 425 includes the information to be sent to peripheral device $S_6$. The packet header portion 423 includes identifying information. In some embodiments, for example, the packet header portion 423 can include at least a portion of an IP 5-tuple. In such embodiments, for example, the packet header portion 423 can include a destination MAC address, a destination internet protocol (IP) address, a source MAC address, a source IP address and/or a transfer protocol. In the present example, the destination MAC address and the destination IP address can be associated with peripheral device $S_6$ and the source MAC address and the source IP address can be associated with peripheral device $S_1$.

The edge device $E_1$ receives the data packet 420 and parses the packet header portion 423 of the data packet 420. In some embodiments, the edge device $E_1$ can use the destination MAC address in the packet header portion in conjunction with a lookup table stored at the edge device $E_1$ to determine an identifier of the destination port (e.g., port 253) to which the peripheral device $S_6$ is coupled and/or an identifier of a destination edge device $E_3$ to which the peripheral device $S_6$ is coupled. The lookup table can, for example, correlate the destination MAC address with the identifier of the destination port (e.g., port 253) and/or the identifier of the destination edge device $E_3$. In some embodiments, for example, the identifier can be a port number, an address (e.g., MAC address, IP address, etc.), an internal unique identifier, an identifier of the second peripheral device itself, and/or any other suitable identifier used to identify the destination peripheral device's $S_6$ position within the switch fabric system 200.

Figure 5:

A destination identifier portion (e.g., a second header) containing an identifier associated with the destination port (e.g., port 253) and/or an identifier associated with a destination edge device $E_3$ can be appended to the data packet 420. For example, FIG. 5 illustrates a data packet 430 having a packet data portion 435, a packet header portion 433 (e.g., a first header), and a destination identifier portion 432 (e.g., a second header). In other embodiments, any other identifier associated with the destination edge device $E_3$, the destination port of the edge device $E_3$, and/or the destination peripheral device $S_6$ can be appended to the data packet as a destination identifier portion.

Using the information contained within the packet header portion 433 of the data packet 430, the edge device $E_1$ can determine to which module $F_1$-$F_N$ to send the data packet 430. While shown in FIG. 2 as being operatively coupled to a single module $F_1$ associated with the first stage, the edge device $E_1$ can be coupled to any number of modules associated with the first stage. Additionally, while shown in FIG. 2 as being operatively coupled to a single switch fabric 230, the edge device $E_1$ can be operatively coupled to any number of switch fabrics, similar to switch fabric 230. In some embodiments, for example, the edge device $E_1$ can be both coupled to the module $F_1$ associated with the first stage of the switch fabric 230 and a module associated with a first stage of a second switch fabric (not shown in FIG. 2). In such embodiments, the edge device $E_1$ can send data to either the module $F_1$ or the module associated with the first stage of the second switch fabric.

In some embodiments, for example, the edge device $E_1$ can use a hash function using as inputs the destination MAC address, the destination IP address, the source MAC address, the source IP address, and/or the transfer protocol. Based on the inputs, the hash function can generate an identifier associated with a module (e.g., module $F_1$) associated with the first stage 232 of the switch fabric 230. In some embodiments, the identifier generated by the hash function can be associated with the module $F_1$ using a lookup table to determine to which output port of the edge device $E_1$ the module $F_1$ is coupled and/or the like. In other embodiments, the identifier produced from the hash function can be an identifier of an output port of the edge device $E_1$ to which the module $F_1$ is coupled. In still other embodiments, any other method of associating the identifier generated by the hash function with the module $F_1$ can be used. Because the identifier associated with the module $F_1$ is generated based on the information in the packet header portion 433 of the data packet 430, every data packet sent from peripheral $S_1$ to peripheral $S_6$ will be sent to the same module (e.g., module $F_1$) associated with the first stage 232.

After the module $F_1$ associated with the first stage 232 receives the data packet 430, it parses the destination identifier portion 432 of the data packet 430. Using the destination identifier within the destination identifier portion 432, the module $F_1$ can determine to which module $G_2$ associated with the second stage 234 of the switch fabric 230 to send the data packet 430. In some embodiments, for example, the module $F_1$ can use a hash function using as an input the destination identifier 432. Based on the destination identifier 432, the hash function can generate an identifier associated with a module (e.g., module $G_2$) associated with the second stage 234, and send the data packet 430 accordingly. In some embodiments, the identifier generated by the hash function can be associated with the module $G_1$ using a lookup table to determine to which output port of the module $F_1$ the module $G_1$ is coupled and/or the like. In other embodiments, the identifier produced from the hash function can be an identifier of an output port of the module $F_1$ to which the module $G_1$ is coupled. In still other embodiments, any other method of associating the identifier generated by the hash function with the module $G_1$ can be used. Because the result of the hash function is based on the destination identifier 432, all data packets 430 within the module $F_1$ being sent to the peripheral device $S_6$ will be sent by $F_1$ to the same module $G_2$ associated with the second stage 234.

The amount of time the module $F_1$ takes to determine to which module to send the data packet 430 can be decreased by using a destination identifier portion 432 of the data packet 430 instead of the packet header portion 433. In some embodiments, for example, the destination identifier portion 433 can be smaller (e.g., fewer bytes of memory) and contain fewer fields than the packet header portion 433. Thus, parsing the destination identifier portion 432 can be faster than parsing the packet header portion 433. Additionally, using a hash function allows the module $F_1$ to quickly determine to which module to send the data packet 430. Such a hash function can be easily implemented and allows for a quick identification of the appropriate module based on the destination identifier portion 432.

Additionally, because a destination MAC address is associated with a destination identifier (e.g., a destination port, a destination edge device $E_3$, etc.) at the edge device $E_1$, the module $F_1$ can forward the data packet 430 without associating a destination MAC address with a destination identifier. This reduces the amount of time used by the module $F_1$ when determining to which module $G_1$-$G_N$ to send the data packet 430. This also reduces the amount of memory used by the module $F_1$ because the module $F_1$ need not store associations between a destination MAC address and destination identifiers. Further, because the association of a destination MAC address with a destination identifier is performed at the edge device $E_1$ and the result stored in the destination identifier portion 432, the modules within the switch fabric 230 need not perform such an association. Moreover, the module $F_1$ can forward the data packet 430 without performing standard layer 2/layer 3 (L2/L3) forwarding, lookup and classification functions (commonly used in Ethernet switch fabrics).

After the module $G_2$ associated with the second stage 234 receives the data packet 430, it parses the destination identifier portion 432 of the data packet 430, similar to the module $F_1$. Using the destination identifier within the destination identifier portion 432, the module $G_2$ can determine to which module $H_1$-$H_N$ associated with the third stage 236 of the switch fabric 230 to send the data packet 430. In some embodiments, for example, the module $G_2$ can use a hash function using as an input the destination identifier. Based on the destination identifier, the hash function can generate an identifier associated with a module (e.g., module $H_2$) associated with the third stage 236, and send the data packet 430 accordingly. Because the result of the hash function is based on the destination identifier, all data packets 430 within the module $G_2$ being sent to the peripheral device $S_6$ will be sent by $G_2$ to the same module $H_2$ associated with the second stage 234.

Similarly, after the module $H_2$ associated with the third stage 236 receives the data packet 430, it parses the destination identifier portion 432 of the data packet 430, similar to the module $F_1$. Using the destination identifier within the destination identifier portion 432, the module $H_2$ can determine to which edge device $E_3$ to send the data packet 430. In some embodiments, for example, the module $H_2$ can use a hash function using as an input the destination identifier. Based on the destination identifier, the hash function can generate an identifier associated with an edge device $E_3$, and send the data packet 430 accordingly. Because the result of the hash function is based on the destination identifier, all data packets 430 within the module $H_2$ being sent to the peripheral device $S_6$ will be sent by $H_2$ to the same edge device $E_3$.

After the edge device $E_3$ receives the data packet 430, the edge device 430 can determine to which peripheral device $S_6$ to send the data packet 430 and send the data packet 430 accordingly. In some embodiments, the edge device $E_3$ can parse the destination identifier portion 432 of the data packet 430. If the destination identifier portion 432 includes an identifier of a specific port 253, the edge device $E_3$ can send the data packet to the peripheral device $S_6$ operatively coupled to the port 253. In other embodiments, the edge device $E_3$ can parse the packet header portion 433. Using the stored SMACs and the destination MAC address in the packet header portion 433, the edge device $E_3$ can determine to which port 253 the destination peripheral device $S_6$ is coupled and send the data packet accordingly. In some embodiments, prior to sending the data packet 430 to the destination peripheral device $S_6$, the destination identifier portion 432 is removed from the data packet 430. Accordingly, in such embodiments, the destination peripheral device $S_6$ receives a data packet similar to the data packet 420 of FIG. 4.

As discussed above, because the routing decision at the edge device $E_1$ is based on a hash function using as inputs a destination MAC address, a destination IP address, a source MAC address, a source IP address and/or a transfer protocol (e.g., the data within a packet header portion of a data packet), each data packet sent from a first peripheral device (e.g., $S_1$) to a second peripheral device (e.g., $S_6$) is sent to the same module $F_1$ associated with the first stage 232. Additionally, as discussed above, because the routing decisions in the switch fabric 230 (e.g., at modules $F_1$, $G_2$, and $H_2$) are based on the a destination identifier portion 432 appended to the data packet 430 at the edge device $E_1$, each data packet 430 sent from the first peripheral device (e.g., $S_1$) to the second peripheral device (e.g., $S_6$) traverses the same path 222 through the switch fabric 230 (e.g., from $F_1$ to $G_2$, from $G_2$ to $H_2$, and from $H_2$ to $E_3$). This ensures that each data packet sent from the first peripheral device (e.g., $S_1$) to the second peripheral device (e.g., $S_6$) traverses the switch fabric system 200 using the same path 222. Accordingly, the order in which packets are sent from the first peripheral device (e.g., $S_1$) to the second peripheral device (e.g., $S_6$) is preserved. Said another way, if a second data packet is sent from peripheral device $S_1$ to peripheral device $S_6$ after a first data packet is sent from peripheral device $S_1$ to peripheral device $S_6$, the first data packet will arrive at peripheral device $S_6$ prior to the second data packet arriving at peripheral device $S_6$.

Figure 6:
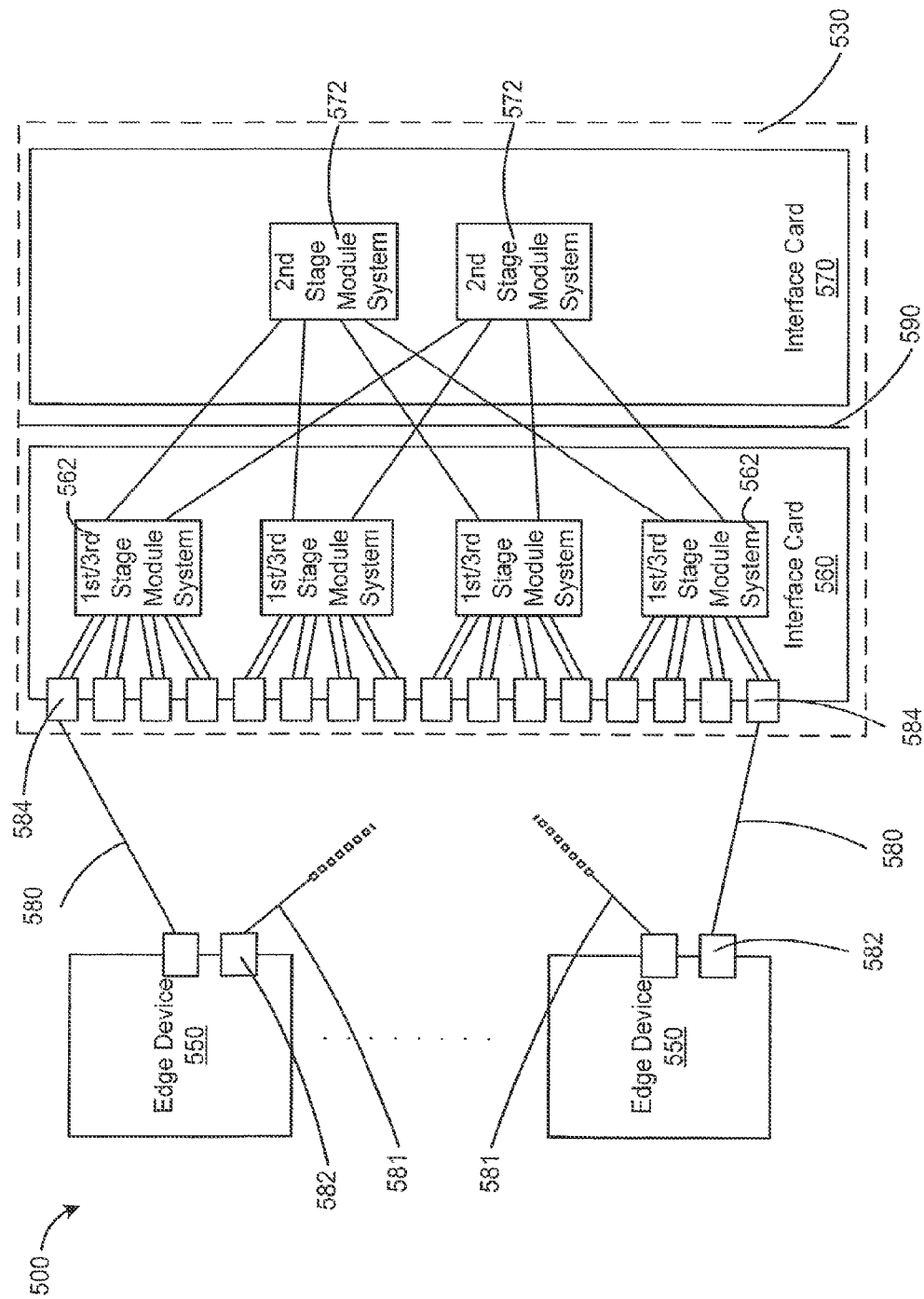
FIG. 6 is a schematic illustration of a switch fabric system, according to another embodiment.

FIG. 6 is a schematic illustration of a switch fabric system 500, according to another embodiment. The switch fabric system 500 includes multiple edge devices 550 and a switch fabric chassis 530. The multiple edge devices 550 can be similar to the edge devices 250 shown and described above with respect to FIG. 2. As such, each edge device 550 can be operatively coupled to multiple peripheral devices (not shown in FIG. 6) and to the switch fabric chassis 530. The peripheral devices can be similar to the peripheral devices 270 shown and described above with respect to FIG. 2. As such, the peripheral devices 270 can send data (e.g., data packets, data cells, etc.) to and receive data (e.g., data packets, data cells, etc.) from the edge devices 550.

The edge devices 550 include multiple cable connector ports 582 each configured to be coupled to an end portion of a cable 580. Through the cables 580, each edge device 550 can be operatively coupled to the switch fabric chassis 530. Each edge device 550 can function as a source edge device and a destination edge device. Accordingly, each edge device 550 can send data to and receive data from the switch fabric chassis 530.

The cables 580 can be constructed of any material suitable to transfer data between the edge devices 550 and the switch fabric chassis 530. In some embodiments, for example, each cable 580 is constructed of multiple optical fibers. In such an embodiment, each cable 580 can have, for example, twelve transmit and twelve receive fibers. The twelve transmit fibers of each cable 580 can include eight fibers for transmitting data, one fiber for transmitting a control signal, and three fibers for expanding the data capacity and/or for redundancy. Similarly, the twelve receive fibers of each cable 580 have eight fibers for receiving data, one fiber for receiving a control signal, and three fibers for expanding the data capacity and/or for redundancy. In other embodiments, any number of fibers can be contained within each cable. In some embodiments, for example, the cables 580 can be 40 gigabit (40G) cables. The transmit and receive designations of the fibers are from the perspective of the edge devices 550. The designations are opposite if viewed from the perspective of the switch fabric chassis 530.

While shown in FIG. 6 as being operatively coupled to a single switch fabric chassis 530, in some embodiments, each edge device 550 is operatively coupled to a second switch fabric chassis (not shown in FIG. 6). In such embodiments, for example, the cables 581 (which can be structurally and functionally similar to cables 580) can be used to operatively couple the edge devices 550 to a second switch fabric chassis. In other embodiments, each edge device can be operatively coupled to any number of switch fabric chassis using any number of cables.

The switch fabric chassis 530 includes multiple interface cards 560 (only a single interface card 560 from a set of multiple interface cards 560 is shown in FIG. 6), multiple interface cards 570 (only a single interface card 570 from a set of multiple interface cards 570 is shown in FIG. 6) and a midplane 590. In some embodiments, the midplane 590 can be configured to operatively couple each interface card 560 with each interface card 570. Accordingly, a 1st/3rd stage module system 562 on an interface card 560 can send data to and/or receive data from any 2nd stage module system 572 on any of the interface cards 570. Similarly, a 2nd stage module system 572 on an interface card 570 can send data to and/or receive data from any 1st/3rd stage module system 562 on any of the interface cards 560. In some embodiments, the midplane 590 can include multiple 20 gigabit (20G) connections between the interface cards 560 and the interface cards 570. As discussed above, in some embodiments, the midplane 590 can be similar to the midplane shown and described in U.S. application Ser. No. 12/345,500, filed Dec. 29, 2008, and entitled "System Architecture for a Scalable and Distributed Multi-Stage Switch Fabric," which is incorporated herein by reference in its entirety.

The interface card 560 includes multiple cable connector ports 584 and multiple 1st/3rd stage module systems 562. The cable connector ports 584 can be similar to the cable connector ports 582. Accordingly, each cable connector port 584 can be configured to receive an end of a cable 580. Via a cable connector port 582, a cable 580 and a cable connector port 584, an edge device 550 can be operatively coupled to an interface card 560.

Each 1st/3rd stage module system includes a module associated with a first stage of the switch fabric system 500 and a module associated with a third stage of the switch fabric system 500. The module associated with the first stage and the module associated with the third stage can be similar to the modules 232 and the modules 234, respectively, shown and described above with respect to FIG. 2.

The 1st/3rd stage module systems 562 can be application-specific integrated circuits (ASICs) or chip packages having multiple ASICs. The 1st/3rd stage module systems 562 can be instances of the same ASIC or chip package. Said another way, the ASIC or chip package of each 1st/3rd stage module system 562 can be substantially similar (i.e., the same kind or type) to the ASIC or chip package of other 1st/3rd stage module systems 562. Thus, manufacturing costs can be decreased because multiple instances of a single ASIC or chip package can be produced.

The interface card 570 includes multiple 2nd stage module systems 572. Each 2nd stage module system 572 includes a module associated with a second stage of the switch fabric system 500. The module associated with the second stage can be similar to the modules 236, respectively, shown and described above with respect to FIG. 2.

Similar to the 1st/3rd stage module systems 562, the 2nd stage module systems 572 can be application-specific integrated circuits (ASICs) or chip packages having multiple ASICs. The 2nd stage module systems 572 can be instances of the same ASIC or chip package. Said another way, the ASIC or chip package of each 2nd stage module system 572 can be substantially similar (i.e., the same kind or type) to the ASIC or chip package of other 2nd stage module systems 562. Thus, manufacturing costs can be decreased because multiple instances of a single ASIC or chip package can be produced.

In some embodiments, the switch fabric system 500 includes eight interface cards 560 each operatively coupled to eight interface cards 570 through the midplane 590. In such embodiments, each interface card 560 can include sixteen cable connector ports 584. As such, the switch fabric chassis 530 can include 128 cable connector ports 584 to which edge devices 550 can be coupled (8 interface cards (560)×16 cable connector ports (584) per interface card (560)=128 total cable connector ports 584). Accordingly, in such embodiments, 128 edge devices 550 can be coupled to the switch fabric chassis 530.

In use, the switch fabric system 500 functions similar to the switch fabric system 200, shown and described above. As such a first peripheral device (not shown in FIG. 6) coupled to a first edge device 550 can be configured to send a data packet to a second peripheral device (not shown in FIG. 6) coupled to a second edge device 550, via the first edge device 550, the switch fabric chassis 530 and the second edge device 550.

The first peripheral device can send the data packet to the first edge device 550. The data packet can be similar to the data packet 420 shown and described in FIG. 4, and can include a packet data portion 425 and a packet header portion 423. The packet data portion 425 includes the information to be sent to second peripheral device. The packet header portion 423 includes identifying information. As discussed above, in some embodiments, for example, the packet header portion 423 can include at least a portion of the IP 5-tuple. In such embodiments, for example, the packet header portion can include a destination MAC address, a destination IP address, a source MAC address, a source IP address and/or a transfer protocol. In the present example, the destination MAC address and the destination IP address can be associated with the second peripheral device; the source MAC address and the source IP address can be associated with the first peripheral device.

The edge device 550 receives the data packet and parses the packet header portion of the data packet. In some embodiments, for example, the edge device 550 can use the destination MAC address in the packet header portion in conjunction with a lookup table stored at the edge device 550 to determine an identifier of the destination port to which the second peripheral device is coupled and/or an identifier of a destination edge device 550 to which the second peripheral device is coupled. The lookup table can, for example, correlate the destination MAC address with the identifier of the destination port and/or the identifier of the destination edge device 550. In some embodiments, for example, the identifier can be a port number, an address (e.g., MAC address, IP address, etc.), an internal unique identifier, an identifier of the second peripheral device itself, and/or any other suitable identifier used to identify the destination peripheral device's position within the switch fabric system 500.

A destination identifier portion (e.g., a second header) containing the identifier associated with the destination port and/or the identifier associated with a destination edge device 550 can be appended to the data packet 420. For example, FIG. 5 illustrates a data packet 430 having a packet data portion 435, a packet header portion 433 (e.g., a first header), and a destination identifier portion 432 (e.g., a second header). In other embodiments, any other identifier associated with the destination edge device, the destination port of the edge device, and/or the second peripheral device can be appended to the data packet as a destination identifier portion.

Using the information contained within the packet header portion 433 of the data packet 430, the edge device 550 can determine to which 1st/3rd stage module system 562 to send the data packet 430. While shown in FIG. 6 as being operatively coupled to a single 1st/3rd stage module 562, each edge device 550 can be coupled to any number of 1st/3rd stage module systems 562. Similarly, each edge device 550 can be operatively coupled to any number of switch fabrics.

In some embodiments, for example, the edge device 550 can use a hash function using as inputs the destination MAC address, the destination IP address, the source MAC address, the source IP address, and/or the transfer protocol. Based on the inputs, the hash function can generate an identifier associated with a first stage module within a 1st/3rd stage module system 562. Because the identifier associated with the module is generated based on the information in the header portion 433 of the data packet 430, every data packet sent from the first peripheral device to the second peripheral device will be sent to the same 1st/3rd stage module system 562.

Additionally, as described above, in some embodiments, each edge device 550 can be coupled to more than one switch fabric. In such embodiments, the hash function at the edge device can be used by the edge device to determine to which switch fabric to send the data. For example, depending on the result of the hash function, the edge device 550 can send the data via a cable 580 to the first switch fabric chassis 530 or can send the data via a cable 581 to the second switch fabric chassis (not shown in FIG. 6).

After the module associated with the first stage within the 1st/3rd stage module system 562 receives the data packet 430, it parses the destination identifier portion 432 of the data packet 430. Using the destination identifier within the destination identifier portion 432, the first stage module can determine to which second stage module system 572 to send the data packet 430. In some embodiments, for example, the first stage module can use a hash function using as an input the destination identifier. Based on the destination identifier, the hash function can generate an identifier associated with a second stage module within a second stage module system 572, and send the data packet 430 accordingly. Because the result of the hash function is based on the destination identifier, all data packets 430 within the same first stage module being sent to the same peripheral device will be sent by the first stage module to the same second stage module.

The amount of time a first stage module takes to determine to which second stage module to send the data packet 430 can be decreased by using a destination identifier portion 432 of the data packet 430 instead of the packet header portion 433. In some embodiments, for example, the destination identifier portion 433 can be smaller (e.g., fewer bytes of memory) and contain fewer fields than the packet header portion 433. Thus, parsing the destination identifier portion 432 can be faster than parsing the packet header portion 433. Additionally, using a hash function allows a first stage module to quickly determine to which second stage module to send the data packet 430. Such a hash function can be easily implemented and allows for a quick identification of the appropriate second stage module based on the destination identifier portion 432.

Additionally, because a destination MAC address is associated with a destination identifier (e.g., a destination port, a destination edge device 550, etc.) at the source edge device 550, the first stage module can forward the data packet 430 without associating a destination MAC address with a destination identifier. This reduces the amount of time used by the first stage module when determining to which second stage module to send the data packet 430. This also reduces the amount of memory used by the first stage module as the first stage module need not store associations between a destination MAC address and destination identifiers (e.g., the first stage module need not store a lookup table). Further, because the association of a destination MAC address with a destination identifier is performed at a source edge device 550 and the result stored in the destination identifier portion 432, the modules within the switch fabric chassis 530 need not perform such an association. Moreover, the first stage module can forward the data packet 430 without performing standard L2/L3 forwarding, lookup and classification functions (commonly used in Ethernet switch fabrics).

As shown in FIG. 6, the data is sent from the 1st/3rd stage module system 562 to a 2nd stage module system 572 via the midplane 590. As discussed above, each interface card 560 can be operatively coupled to eight interface cards 570 via the midplane 590. As such, based on the destination identifier, the 1st/3rd stage module system 562 can send the data to a 2nd stage module system 572 on any of the eight interface cards 570 via the midplane 590.

Similar to the first stage module within the 1st/3rd stage module system 562, the second stage module within the 2nd stage module system 572 can parse the destination identifier portion 432 of the data packet 430 and use the destination identifier portion 432 (e.g., as an input to a hash function) to determine to which third stage module within a 1st/3rd stage module system 562 to send the data packet 430. The data packet 430 can be sent to the 1st/3rd stage module system 562 via the midplane 590.

Further, the third stage module within the 1st/3rd stage module system 562 can parse the destination identifier portion 432 of the data packet 430 and use the destination identifier portion 432 (e.g., as an input to a hash function) to determine to which edge device 550 to send the data packet. The data packet 430 can be sent to the edge device 550 via a cable 580.

As discussed above, because the routing decision at the source edge device 550 is based on a hash function using as inputs a destination MAC address, a destination IP address, a source MAC address, a source IP address and/or a transfer protocol, each data packet sent from a first peripheral device to a second peripheral device is sent to the same first stage module within the same 1st/3rd stage module system 562. Additionally, as discussed above, because the routing decisions in the switch fabric chassis 530 (e.g., at the 1st/3rd stage module systems 562 and the 2nd stage module systems 572) are based on a destination identifier portion 432 appended to the data packet 430 at the source edge device 550, each data packet 430 sent from the first peripheral device to the second peripheral device traverses the same path through the switch fabric chassis 530 (e.g., passes through the same module systems 562, 572). This ensures that each data packet sent from the first peripheral device to the second peripheral device traverses the switch fabric system 500 using the same path. Accordingly, the order in which packets are sent from the first peripheral device to the second peripheral device is preserved. Said another way, if a second data packet is sent from the first peripheral device to the second peripheral device after a first data packet is sent from the first peripheral device to the second peripheral device, the first data packet will arrive at second peripheral device prior to the second data packet arriving at the second peripheral device.

In some embodiments, a control module (not shown in FIG. 6) can be disposed on each interface card 560, 570 and/or at each edge device 550. Such a control module can include a processor and a memory. In such embodiments, the control module can receive control signals from the switch fabric system 500 relating to the operation of the switch fabric system 500. For example, flow control signals, error signals and/or the like can be sent to the control module. In such embodiments, control of the switch fabric system can be said to be distributed. In other embodiments, the control module can be a central control module operatively coupled to each interface card and/or each edge device. In such embodiments, the central control module controls the module systems and/or the edge devices. In some embodiments, the switch fabric system 500 can be controlled similar to the systems shown and described in U.S. patent application Ser. No. 12/345,498, filed Dec. 29, 2008, and entitled "Control Plane Architecture for Switch Fabrics," which is incorporated herein by reference in its entirety. Further, in some embodiments, a network administrator can view control information regarding the components of the switch fabric system 500 on a single display.

Figure 7:
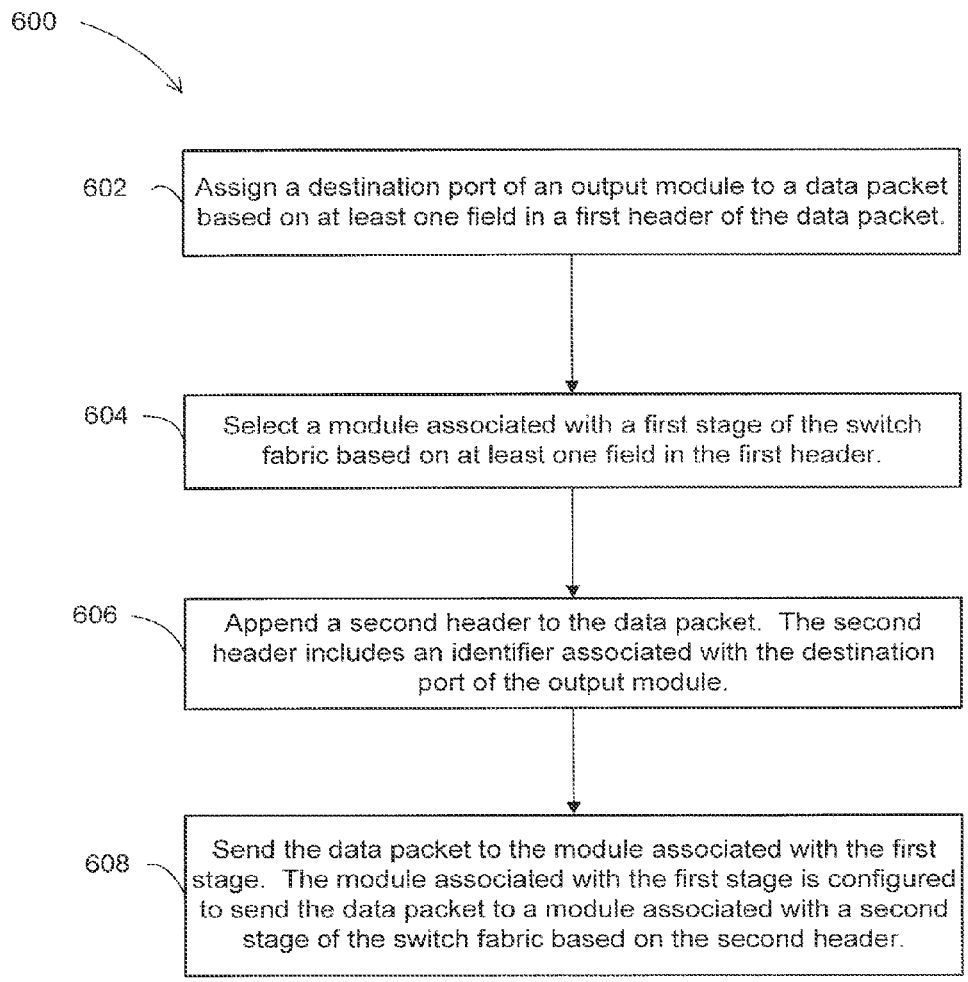
FIG. 7 is flow chart illustrating a method of sending a data packet through a switch fabric, according to another embodiment.

FIG. 7 is flow chart illustrating a method 600 of sending a data packet through a switch fabric, according to another embodiment. The method 600 includes assigning a destination port of an output module to a data packet based on at least one field in a first header of the data packet, at 602. The output module can be, for example, similar to the edge devices shown and described above. The destination port of the output module can be coupled to a destination peripheral device.

Figure 4:
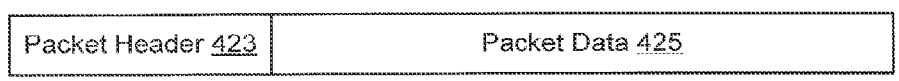
FIGS. 4 and 5 are schematic illustrations of data packets, according to another embodiment.

In some embodiments, the first header can be similar to the packet header portion 423 shown and described with respect to FIG. 4. As such, the first header can include a destination MAC address, a destination internet protocol (IP) address, a source MAC address, a source IP address and/or a transfer protocol. In other embodiments, the first header can include any other data associated with the switch fabric system and/or the data packet.

A module associated with a first stage of the switch fabric is selected based on at least one field in the first header, at 604. The module associated with the first stage can be selected using a hash function. The hash function can use as inputs at least one field in the first header. Because the module associated with the first stage is selected based on the fields in the first header, the same module associated with the first stage will be selected for other data packets having a similar first header (e.g., a second data packet's source and destination are the same as the first data packet's source and destination).

A second header is appended to the data packet, at 606. The second header includes an identifier associated with the destination port of the output module. The second header can be similar to the destination identifier portion 432 shown and described with respect to FIG. 5. As such, the second header can include a destination identifier, such as, for example, an identifier of a destination edge device, an identifier of a destination port at a destination edge device, and/or the like. The destination identifier can be determined using the data in the first header and a lookup table, which can associate the destination MAC address and/or the destination IP address of a destination peripheral device with a destination port to which the destination peripheral device is coupled.

The data packet is sent to the module associated with the first stage, at 608. The module associated with the first stage is configured to send the data packet to a module associated with a second stage of the switch fabric based on the second header. In some embodiments, the module associated with the first stage can use the destination identifier as an input to a hash function to determine to which module associated with the next stage of the switch fabric to send the data packet. Accordingly, the module associated with the first stage need not use a lookup table to associate the destination MAC address and/or the destination IP address of the destination peripheral device with the destination port to which the destination peripheral device is coupled because the second header contains the result of such an association.

Additionally, using the destination identifier to route the data packet through the switch fabric ensures that data packets sent from a same source peripheral device to the same destination peripheral device will traverse the switch fabric using the same path. This ensures that the order the data packets are received by the destination peripheral device is the same as the order in which the data packets were sent by the source peripheral device.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

While shown and described above as using hash functions to determine how to route data through a switch fabric, in other embodiments, any other suitable function can be used to route data through the switch fabric. Some embodiments can include, for example, a mapping function such as a lookup table and/or the like used to route data through the switch fabric.

Further, any suitable type of hash function can be used to route data through the switch fabric. Some embodiments can include, for example, cyclic redundancy check hash functions, checksum hash functions, secure hash algorithms (SHA) such as SHA1, SHA256, etc., message digest (MD) algorithms such as MD2, MD4, MD5, etc., Pearson hash functions, Fowler-Noll-Vo hash functions, Bloom filters and/or the like.

While shown and described as having three-stages, the switch fabric systems shown and described herein can be upgraded to switch fabrics having any number of stages greater than three stages without significantly increasing the end-to-end latency of the switch fabric system. For example, the switch fabric system 500 can be upgraded to a five-stage switch fabric system. Because the modules within the switch fabric do not parse the packet header of the data packet (e.g., packet header 433 of data packet 430 shown in FIG. 5), the modules within the switch fabric can route data through the switch fabric faster than modules that do parse the packet header of the data packet and perform normal L2/L3 forwarding, lookup, and classification functions. Accordingly, when switch fabric system 500 is upgraded, the end-to-end latency is not significantly increased when compared to a switch fabric having modules that parse the packet header of the data packet.

Some embodiments described herein relate to a computer storage product with a computer- or processor-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as general purpose microprocessors, microcontrollers, Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although various embodiments have been described as having particular features and/or combinations of components, other embodiments are possible having a combination of any features and/or components from any of embodiments where appropriate. For example, while shown above as being coupled to a single switch fabric, the edge devices shown and described herein can be coupled to any number of switch fabrics and/or modules associated with a first stage of a switch fabric. In some embodiments, for example, the edge devices are coupled to two switch fabrics. In other embodiments, the edge devices are coupled to more than two switch fabrics.

What is claimed is:

1. A method, comprising:

receiving a first data packet from a first peripheral device including a first data packet header specifying a destination;

appending, at a first edge device, a destination identifier to the first data packet based on the first data packet header to define a first appended data packet, the destination identifier associated with a destination port of a second edge device;

sending the first appended data packet to a module associated with a first stage of a switch fabric based on the first data packet header such that the module associated with the first stage of the switch fabric sends the first appended data packet to a module associated with the second stage of the switch fabric based on the destination identifier, the module associated with the first stage of the switch fabric being from a plurality of modules associated with the first stage of the switch fabric, the module associated with the second stage of the switch fabric being from a plurality of modules associated with the second stage of the switch fabric;

receiving a second data packet including a second data packet header specifying the destination; and appending, at the first edge device, the destination identifier to the second data packet based on the second data packet header to define a second appended data packet.

2. The method of claim 1, wherein the first appended data packet sent to the module associated with the first stage of the switch fabric is sent such that the first stage of the switch fabric sends the first appended data packet to the module associated with the second stage of the switch fabric without the first stage of the switch fabric directly associating the destination identifier with an address of the second edge device.

3. The method of claim 1, wherein the first appended data packet sent to the module associated with the first stage of the switch fabric is sent such that the first stage of the switch fabric sends the first appended data packet to the module associated with the second stage of the switch fabric without the first stage of the switch fabric parsing the first data packet header.

4. The method of claim 1, wherein the first appended data packet sent to the module associated with the first stage of the switch packet is sent such that the module associated with the second stage of the switch fabric sends the first appended data packet to a module associated with a third stage of the switch fabric based on the destination identifier, the module associated with the third stage of the switch fabric being from a plurality of modules associated with the third stage of the switch fabric.

5. The method of claim 4, further comprising:

sending the second appended data packet to the module associated with the first stage of the switch fabric such that the module associated with the first stage of the switch fabric sends the second appended data packet to the module associated with the second stage of the switch fabric based on the destination identifier and such that the module associated with the second stage of the switch fabric sends the second appended data packet to the module associated with the third stage of the switch fabric based on the destination identifier.

6. The method of claim 4, wherein any data packet having the destination identifier at the first edge device is sent to the module associated with the first stage of the switch fabric, the module associated with the second stage of the switch fabric, and the module associated with the third stage of the switch fabric, the method further comprising:

assigning the destination identifier based on a result of a hash function using as input at least one field from the first data packet header, the at least one field from the first data packet header being at least one of a destination MAC address, a destination IP address, a source MAC address, a source IP address, or a transfer protocol.

7. The method of claim 1., wherein the destination is a first destination, the destination identifier is a first destination identifier, and the module associated with the first stage of the switch fabric is a first module associated with the first stage of the switch fabric, and the module associated with the second stage is a first module associated with the second stage of the switch fabric, the method further comprising:

sending the second appended data packet to the first module associated with the first stage of the switch fabric such that the first module associated with the first stage of the switch fabric sends the second appended data packet to the first module associated with the second stage of the switch fabric based on the first destination identifier;

receiving a third data packet including a third data packet header specifying a second destination;

appending, at the first edge device, a second destination identifier to the third data packet based on the third data packet header to define a third appended data packet;

sending the third appended data packet to a second module associated with the first stage of the switch fabric such that the second module associated with the first stage of the switch fabric sends the third appended data packet to a second module associated with the second stage of the switch fabric based on the second destination identifier.

8. A non-transitory processor readable medium storing code representing instructions to be executed by a processor, the code comprising code to cause the processor to:

receive, from an edge device, a first data packet including a first header and a second header, the second header having been appended to the first data packet by the edge device based on the first header;

send the first data packet to a module associated with a stage of a switch fabric based on the second header such that the first data packet is routed to a peripheral device, at least a portion of a route to the peripheral device after the stage of the switch fabric determined based on the second header, the module associated with the stage of the switch fabric being from a plurality of modules associated with the stage of the switch fabric; and receive, from the edge device, a second data packet including a third header and a fourth header, the fourth header, having been appended to the second data packet b the edge device based on the third header such that the second data packet is routed to the peripheral device via the module, associated with the stage of the switch fabric and the portion of the route after the stage of the switch fabric.

9. The non-transitory processor readable medium of claim 8, wherein the code to cause the processor to send the first data packet based on the second header causes the first data packet to be sent without parsing the first header.

10. The non-transitory processor readable medium of claim 8, wherein the processor is a processor of a module of a second stage of a switch fabric such that the first data packet is received from the edge device via a module of a first stage of the switch fabric.

11. The non-transitory processor readable medium of claim 8, wherein:
   the processor is a processor of a module of a first stage of a switch fabric;
   the code to cause the processor to send the first data packet is code to send the first data packet to a module of a second stage of a switch fabric; and
   a route from the module of the second stage of the switch fabric to a module of a third stage of the switch fabric is determined based on the second header.

12. A method, comprising:
   assigning a destination port of an output module to a first data packet based on at least one field in a first header of the first data packet;
   selecting a module associated with a first stage of a switch fabric based on at least one field in the first header, the module associated with the first stage being from a plurality of modules associated with the first stage;
   appending a second header to the first data packet to define a first appended data packet, the second header including an identifier associated with the destination port of the output module;
   sending the first appended data packet to the module associated with the first stage, the module associated with the first stage configured to send the first appended data packet to a module associated with a second stage of the switch fabric based on the second header, the module associated with the second stage being from a plurality of modules associated with the second stage;
   appending the second header to a second data packet to define a second appended data packet based on a first header of the second data packet having t e at least one field of the first header of the first data packet, and such the second appended data packet is routed to the module associated with the second stage of the switch fabric.

13. The method of claim 12, wherein the selecting the module associated with the first stage includes selecting the module associated with the first stage based on at least one of a destination MAC address, a destination IP address, a source MAC address, a source IP address, or a transfer protocol.

14. The method of claim 12, wherein the switch fabric includes at least three stages.

15. The method of claim 12, wherein the selecting the module associated with the first stage includes selecting the module associated with the first stage based on a result of a hash function using as input at least one of a destination MAC address, a destination IP address, a source MAC address, a source IP address, or a transfer protocol.

16. The method of claim 12, wherein the module associated with the first stage is configured to select the module associated with the second stage based on a result of a hash function using as an input the identifier associated with the destination port of the output module.

17. The method of claim 12, wherein the second header of the second data packet includes an identifier associated with the destination port of the output module, the method further comprising:
   assigning the destination port of the output module to the second data packet based on at least one field in the first header of the second data packet;
   selecting the module associated with the first stage of the switch fabric based on at least one of the fields in the first header of the second data packet; and
   sending the second appended data packet to the module associated with the first stage, the module associated with the first stage configured to send the second appended data packet to the module associated with the second stage of the switch fabric based on the second header of the second appended data packet.

18. The method of claim 12, wherein the assigning includes assigning the destination port of the first output module based on a MAC address of a server operatively coupled to the destination port of the first output module.

19. The method of claim 12, wherein the sending the first appended data packet includes sending (1) a data portion of the first appended data packet, (2) the first header, and (3) the second header to the module associated with the first stage.

\* \* \* \* \*